United States Patent [19]

Loeffler et al.

[11] Patent Number: 4,708,428
[45] Date of Patent: Nov. 24, 1987

[54] LIGHT WAVEGUIDE CONNECTOR

[75] Inventors: Herbert Loeffler; Peter Preiner, both of Munich, Fed. Rep. of Germany

[73] Assignee: Siemens Aktiengesellschaft, Berlin & Munich, Fed. Rep. of Germany

[21] Appl. No.: 821.372

[22] Filed: Jan. 22, 1986

[30] Foreign Application Priority Data

Apr. 18, 1985 [DE] Fed. Rep. of Germany ....... 3514075

[51] Int. Cl.4 ................................. G02B 6/36
[52] U.S. Cl. .............................. 350/96.20; 350/96.10
[58] Field of Search ................ 350/96.15, 96.20, 96.21

[56] References Cited

U.S. PATENT DOCUMENTS

| | | | |
|---|---|---|---|
| 4,146,299 | 3/1979 | Wellington et al. | 350/96.21 |
| 4,336,977 | 6/1982 | Monaghan et al. | 350/96.20 |
| 4,445,752 | 5/1984 | Faber et al. | 350/96.20 |
| 4,516,829 | 5/1985 | Borsuk et al. | 350/96.20 |
| 4,593,972 | 6/1986 | Gibson | 350/96.21 |

FOREIGN PATENT DOCUMENTS

| | | |
|---|---|---|
| 1075699 | 2/1960 | Fed. Rep. of Germany . |
| 2835582 | 2/1980 | Fed. Rep. of Germany . |
| 8014507 | 12/1981 | France . |
| 58-211725 | 9/1983 | Japan . |

Primary Examiner—William L. Sikes
Assistant Examiner—Akm E. Ullah
Attorney, Agent, or Firm—Jeffrey P. Morris

[57] ABSTRACT

For the operationally safe enclosure and termination of a light waveguide cable in a light waveguide connector, an end section of a Kevlar fiber layer of the cable for absorbing tensile stresses and over which the cable jacket has been removed is placed over a hollow cylindrical extension of the connector whose outside is provided with transverse grooves, whereupon a sleeve of elastic plastic previously pushed over the cable is further pushed over the extension convered by the fiber layer. The inside of the sleeve is provided with a groove structure complementary to the transverse grooves of the extension so that the grooves of the extension mesh with those of the sleeve like teeth, thereby firmly clamping the Kevlar fiber layer between extension and sleeve and forcing a zigzag shape in the fiber layer.

6 Claims, 1 Drawing Figure

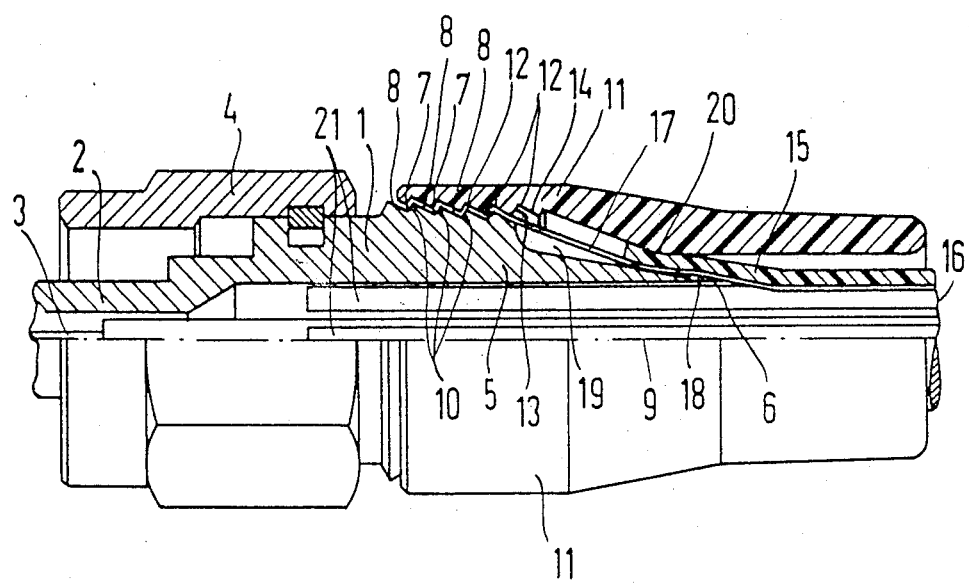

LIGHT WAVEGUIDE CONNECTOR

BACKGROUND OF THE INVENTION

1. Technical Field

The invention relates to the field of light waveguide connectors and more particularly, to one with a hollow-cylindrical extension provided at its cable end and a clamping sleeve which can be pushed over said extension, both the extension and the clamping sleeve being equipped, at least in a partial area of their overlapping surfaces, with grooves oriented mainly transverse to the connectors' longitudinal axis.

2. Description of the Prior Art

A coaxial cable connector is known from German PS No. 1 075 699 where a hollow cylindrical cable connector extension whose outside is pointed in taper fashion pushes under an end section of a shielding mesh forming the outer conductor of a coaxial cable. Subsequently, a rigid sleeve having a matching taper on its inside is pushed over the cable end and over the extension covered by the shelding mesh and the cable jacket. On their mutually facing sides, both extension and sleeve are provided with cross grooves having sharp edges whose steeper limiting walls are located on the side of the grooves where the cable connects, whereas the limiting walls of the grooves opposite the steeper walls are flat. By means of a cap nut, internal shoulders of which push against the sleeve, the sleeve is pressed against the extension covered by the cable jacket and the shielding mesh, thereby clamping jacket and shielding mesh between sleeve and extension, the clamping action being further improved by the groove structure of sleeve and extension. The outer conductor or shielding mesh and the cable jacket are thus fixed operationally safe in the connector, and tensile stresses acting upon the cable are reliably absorbed. But a cap nut is additionally required to clamp the sleeve.

In contrast thereto, it is an object of the present invention to design a light waveguide connector for an optical fiber cable of the kind described above for a coaxial cable so that the light waveguide cable is enclosed and terminated with operational reliability without complicating the connector design.

SUMMARY OF THE INVENTION

According to the invention, this problem is solved in that the clamping sleeve, at least in the groove area, is designed so as to be elastically expandable, the limiting walls of its grooves being matched in complementary fashion to the limiting walls of the grooves of the extension so that the grooves of the clamping sleeve are pushed over the extension and match with the grooves of the extension like teeth. Also, only an end section of a fiber layer located under the jacket of a light waveguide cable is placed over the groove area of the extension, so that the groove area of the clamping sleeve pushed over the light waveguide cable is subsequently disposed over the groove area of the extension covered by the fiber layer.

The clamping sleeve is thus elastically expanded, the less steeply inclined limiting walls of the grooves of both parts advantageously facilitating pushing the clamping sleeve over the extension. But in the direction opposite to the direction in which the clamping sleeve is pushed over the extension, steeper limiting walls of the grooves of both parts prevent the clamping sleeve from being pulled off the extension again. Therefore, due to its elasticity and the shape of the grooves, the clamping sleeve is advantageously retained automatically on the extension, also clamping the fiber layer extending from under the optical fiber cable jacket with operational reliability.

In a further development of the invention, it may be provided to equip only an area of the extension facing away from the cable connection end of the extension with the grooves; to provide the extension at its cable connection end with a wedgeshaped area; and to provide between the wedgeshaped area and the grooved area of the extension, on the outside of the extension, a circular depression which is offset in step form at least opposite the wedgeshaped area.

In this manner there is created a space between the clamping sleeve and the extension in which the jacket end of the light waveguide cable can nestle without thereby hindering the sliding action of the clamping sleeve onto the extension.

It may be further provided advantageously in the light waveguide connector according to the invention to equip the inside of the clamping sleeve with a circular edge in the area of the depression and to give the clamping sleeve a smaller inside diameter in the area of the edge than in the area of the grooves.

This forms a clamping point for the cable jacket in the area of the depression in the extension so that no foreign matter can penetrate the connector interior from the cable connection side of the light waveguide connector.

It is also advantageous for the inside diameter of the clamping sleeve to be approximately constant over the length of its grooved area.

In further development of the invention, it may further be provided for the included angle between the connector axis and less steep groove limiting walls to be approximately 30 degrees, while being approximately 60 degrees for the steeper limiting walls, and for the groove depth to be about 0.3 mm.

One exemplary embodiment of the invention is explained below in greater detail with reference to a FIGURE.

DETAILED DESCRIPTION

The FIGURE shows, in side view, one half of which is sectioned, and greatly magnified, a light waveguide connector, the basic body of which is essentially a hollow cylindrical sleeve 1. The sleeve 1 transitions on the plug side of the connector into a pin 2 at whose face the face of the light waveguide 3, fixed in the connector axis, forms a light entry or exit window through which light signals, transported for example by the light waveguide 3, can transfer, for example, to another light waveguide. A cap nut 4, rotatably fastened to the outside of sleeve 1, makes it possible to fix the connector to a matching connector which may also be an apparatus socket, for example.

On the cable connection side of the connector, the sleeve 1 is provided with a hollow cylindrical extension 5 prolonging the sleeve 1.

In an area facing away from the cable end 6 of the extension 5, the extension 5 has external grooves 7 which, for the most part, are oriented transverse to the connector axis 9, are of wedgeshaped cross-sectional profile and have limiting walls of different steepness. For instance, the limitng walls 8 of the grooves of the extension 5 facing the cable side form an angle of approximately 30 degrees with the connector axis 9. In contrast thereto, the limitng walls 10 of the grooves 7 of the extension 5 facing away from the cable end of the connector include with the connector axis 9 an angle of approximately 60 degrees.

A clamping sleeve 11 consisting of elastically ductile plastic is designed so that it can be pushed onto the extension 5, in particular, onto the area of the extension 5 equipped with the grooves 7. The inside of the clamping sleeve 11 also has an area provided with grooves 12 which can be pushed over and complement the grooved area of the extension. In relaxed condition, the inside diameter of the grooved area of the clamping sleeve 11 is constant and smaller than the outside diameter of the extension 5 between the grooves 7 of the extension. The groove structure of the clamping sleeve 11 is complementary to the grooves 7 of extension 5. Therefore, those limiting walls 13 of the clamping sleeve 11 which face the cable end of the connector are inclined more steeply and form an angle of approximately 60 degrees with the connector axis 9 than the limiting walls 14 of the clamping sleeve grooves which include an angle of approximately 30 degrees with the connector axis 9.

When pushing the clamping sleeve 11 over the grooved area of the extension 5, the less steep limiting walls 8, 14 of the grooves 7, 12 of extension and clamping sleeve facilitate pushing the clamping sleeve onto the extension.

Before the clamping sleeve is pushed over the grooved area of the extension 5, this grooved area is covered with an end section of a Kevlar ® fiber layer located directly under a jacket 15 and not covered by the jacket 15 of the light waveguide cable 16. (Kevlar is a trademark of E. I. DuPont De Nemours). This Kevlar fiber layer 17 is provided for the purpose of absorbing tensile stresses acting upon the light waveguide cable 16. The fiber layer, evenly distributed over the circumference of the extension 5, is clamped between the sleeve and the extension due to the clamping sleeve 11 being pushed over the extension 5. Due to the meshing of the teeth of the clamping sleeve 11 and the extension 5 in the area in which the grooves 7, 12 of extension and clamping sleeve engage mutually, a zigzag shape is impressed on the fiber layer 17 which, together with the clamping effect between sleeve and extension, anchors the fiber layer operationally safe to the connector, thereby retaining the light waveguide cable in the connector.

The thickness of the fiber layer 17 is approximately 0.1 millimeters so that, at a groove depth of about 0.3 millimeters, adequate meshing of the teeth of sleeve and extension is still assured. The sleeve 11, meshing with the extension, can no longer be pulled off the extension 5 without destruction.

Between the grooved area and the wedgeshaped area 18, the outside of a central area of the extension 5 has a circular depression 19. Into this depression projects an edge 20 of the clamping sleeve 11 when the latter is pushed onto the extension so that the jacket 15 of the light waveguide cable 16, extending into the area of the depression 19, is clamped between the edge 20 and the base of the depression 19, if the distance between clamping sleeve 11 and extension 5 in the area of the edge 20 is suitably dimensioned. This makes for an adequate seal between the connector and the jacket of the light waveguide cable 16.

The light waveguide 3 is surrounded by elastic rods 21 located, together with the light waveguide 3, in the area of the extension 5 within the bore going through the connector concentric to the axis 9.

While the invention has been thus particularly shown and described with reference to a specific exemplary embodiment, it will be understood that various modifications may be made without departing from the spirit and scope of this invention.

What is claimed is:

1. A light waveguide connector having a cable end and a plug end, with a hollow-cylindrical extension provided at the cable end of the connector and a clamping sleeve which can be pushed over said extension, both the extension on an outside of the extension, and the clamping sleeve on an inside of the sleeve being equipped, at least in a partial area respectively with grooves oriented mainly transverse to a longitudinal axis of the connector, characterized in that the clamping sleeve, at least in a groove area, is designed so as to be elastically expandable, limiting walls of the grooves of the clamping sleeve being complementary to limiting walls of the grooves of the extension so that the grooves of the clamping sleeve when the sleeve is pushed over the extension mesh with the grooves of the extension and further characterized in that an end section of a strength member of a light waveguide cable consisting of a fiber layer located under a jacket of the cable is placed over a groove area of the extension, whereupon the clamping sleeve, previously provided with the grooves is disposed with the groove area on the groove area of the extension covered by the fiber layer.

2. A light waveguide connector according in claim 1 further characterized in that only an area of the extension away from a cable end of the extension is provided with said grooves; and wherein said extension has a wedgeshaped area at the cable end; and wherein a circular depression, offset in step from at least opposite the wedgeshaped area, is provided on the outside of the extension between the wedgeshaped area and the grooved area of the extension.

3. A light waveguide connector according to claim 2 further characterized in that, in the area of the depression, the clamping sleeve is provided on the inside thereof with a circular edge end is of smaller inside diameter in the area of the edge than in the grooved area.

4. A light waveguide connector according to claim 1 further characterized in that the clamping sleeve is provided with a substantially constant inside diameter over the length of its grooved area.

5. A light waveguide connector according to claim 4 further characterized in that less steep limiting walls of the grooves form an angle of approximately 30 degrees with a longitudinal axis of the connector and, in contrast thereto, steeper limiting walls form an angle of approximately 60 degrees.

6. A light waveguide connector according to claim 5 further characterized in that the groove depth is approximately 0.3 mm.

* * * * *